(12) United States Patent
Boulton et al.

(10) Patent No.: US 10,584,471 B2
(45) Date of Patent: Mar. 10, 2020

(54) INTEGRATED RETAINING WALL AND FLUID COLLECTION SYSTEM

(71) Applicants: James Bradford Boulton, Cumming, GA (US); Isaac Landon Anthony, Lakewood, CO (US)

(72) Inventors: James Bradford Boulton, Cumming, GA (US); Isaac Landon Anthony, Lakewood, CO (US)

(*) Notice: Subject to any disclaimer, the term of this patent is extended or adjusted under 35 U.S.C. 154(b) by 71 days.

(21) Appl. No.: 16/010,196

(22) Filed: Jun. 15, 2018

(65) Prior Publication Data
US 2018/0363283 A1 Dec. 20, 2018

Related U.S. Application Data

(60) Provisional application No. 62/520,284, filed on Jun. 15, 2017.

(51) Int. Cl.
| | |
|---|---|
| *E03F 1/00* | (2006.01) |
| *E02D 29/02* | (2006.01) |
| *B65G 5/00* | (2006.01) |
| *E03B 1/04* | (2006.01) |
| *E03F 5/10* | (2006.01) |

(52) U.S. Cl.
CPC ............... *E03F 1/00* (2013.01); *B65G 5/00* (2013.01); *E02D 29/0266* (2013.01); *E03B 1/041* (2013.01); *E03F 1/002* (2013.01); *E03F 5/10* (2013.01); *E03F 5/101* (2013.01)

(58) Field of Classification Search
CPC ... E03F 1/00; E03F 1/002; E03F 1/005; E03F 5/10; E03F 5/101; E02D 29/0266; B65G 5/00

USPC ............... 210/170.03, 170.08, 747.2, 737.3; 405/36, 52, 53
See application file for complete search history.

(56) References Cited

U.S. PATENT DOCUMENTS

| | | |
|---|---|---|
| 39,624 A | 8/1863 | Bainbridge |
| 617,991 A | 1/1899 | McDill |
| 1,301,024 A | 4/1919 | Wendelken |
| 1,698,079 A | 1/1925 | Wagner |
| 1,572,887 A | 2/1926 | Dale |
| 1,734,392 A | 11/1929 | Moore |
| 1,860,533 A | 5/1932 | Fredenhagen |
| 2,043,734 A | 12/1933 | Camp |

(Continued)

FOREIGN PATENT DOCUMENTS

| | | |
|---|---|---|
| EP | 0780524 | 6/1997 |
| EP | 1522638 | 4/2005 |

(Continued)

OTHER PUBLICATIONS

"Abutments," WisDOT Bridge Manual, Chapter 12, Jul. 2013, 38 pages.

(Continued)

*Primary Examiner* — Christopher Upton
(74) *Attorney, Agent, or Firm* — Sheridan Ross PC

(57) ABSTRACT

A fluid collection and retention system is provided. In some embodiments, the system is integrated with and comprises a retaining wall structure, and the retaining wall structure forms at least a portion of an enclosed volume of a module for collecting and storing fluid. Various features of a fluid retention module and related supporting structures are also provided.

20 Claims, 10 Drawing Sheets

(56) References Cited

U.S. PATENT DOCUMENTS

| | | |
|---|---|---|
| 2,147,035 A | 2/1939 | Henderson |
| 2,802,339 A | 8/1957 | Fogerty |
| 2,900,083 A | 8/1959 | Oliver |
| 3,339,366 A | 9/1967 | Gogan et al. |
| 3,579,995 A | 5/1971 | Flynn |
| 3,645,100 A | 2/1972 | La Monica |
| 3,678,637 A | 7/1972 | Klipfel |
| 3,720,022 A | 3/1973 | Dattner |
| 3,742,660 A | 7/1973 | Bierweiler |
| 3,778,528 A | 12/1973 | Heifetz et al. |
| 3,794,433 A | 2/1974 | Schupack |
| 3,871,146 A | 3/1975 | Hamy |
| 3,878,656 A | 4/1975 | Duwe et al. |
| 3,882,683 A | 5/1975 | Purcell |
| 3,906,687 A | 9/1975 | Schupack |
| 3,908,324 A | 9/1975 | Stout |
| 3,910,051 A | 10/1975 | Komisarek |
| 3,922,823 A | 12/1975 | King et al. |
| 4,048,772 A | 9/1977 | Gaul |
| 4,050,215 A | 9/1977 | Fisher |
| 4,124,964 A | 11/1978 | Juriss et al. |
| 4,185,429 A | 1/1980 | Mendola |
| 4,194,339 A | 3/1980 | Fisher |
| 4,211,504 A | 7/1980 | Sivachenko |
| 4,220,423 A | 9/1980 | Sivachenko |
| 4,313,692 A | 2/1982 | Johnson |
| 4,314,775 A | 2/1982 | Johnson |
| 4,459,063 A | 7/1984 | Shaw |
| 4,495,131 A | 1/1985 | Del Valle |
| 4,539,780 A | 9/1985 | Rice |
| 4,564,313 A | 1/1986 | Niswander et al. |
| 4,594,024 A | 6/1986 | Jenkner et al. |
| 4,635,895 A | 1/1987 | Johnson, Jr. et al. |
| 4,668,129 A | 5/1987 | Babcock et al. |
| 4,735,234 A | 4/1988 | Matiere |
| 4,761,126 A | 8/1988 | del Valle |
| 4,824,293 A | 4/1989 | Brown et al. |
| 4,825,494 A | 5/1989 | King |
| 4,942,708 A | 7/1990 | Krumholz et al. |
| 4,953,280 A | 9/1990 | Kitzmiller |
| 4,969,626 A | 11/1990 | Strauch |
| 4,993,872 A | 2/1991 | Lockwood |
| 5,011,331 A | 4/1991 | Clavarino |
| 5,051,028 A | 9/1991 | Houck et al. |
| 5,103,604 A | 4/1992 | Teron |
| 5,161,912 A | 11/1992 | Schlueter et al. |
| 5,189,855 A | 3/1993 | Williams et al. |
| 5,199,233 A | 4/1993 | Fukutomi et al. |
| 5,199,819 A | 4/1993 | Matiere |
| 5,207,038 A | 5/1993 | Negri |
| 5,243,794 A | 9/1993 | Pikor |
| 5,257,880 A | 11/1993 | Janopaul, Jr. |
| 5,281,053 A | 1/1994 | Matiere |
| 5,308,195 A | 5/1994 | Hotek |
| 1,335,061 A | 9/1994 | Scales |
| 5,417,523 A | 5/1995 | Scales |
| 5,492,438 A | 2/1996 | Hilfiker |
| 5,533,839 A | 7/1996 | Shimada |
| 5,540,525 A | 7/1996 | Miller et al. |
| 5,542,780 A | 8/1996 | Kourgli |
| 5,669,194 A | 9/1997 | Colasanto et al. |
| 5,697,736 A | 12/1997 | Veazey et al. |
| 5,711,130 A | 1/1998 | Shatley |
| 5,759,415 A | 6/1998 | Adams |
| 5,810,510 A | 9/1998 | Urriola |
| D403,437 S | 12/1998 | Risi et al. |
| 5,875,821 A | 3/1999 | Dumser et al. |
| 5,890,838 A | 4/1999 | Moore, Jr. et al. |
| 5,946,872 A | 9/1999 | Pardo |
| 6,000,183 A | 12/1999 | Newman |
| 6,019,550 A | 2/2000 | Wrigley et al. |
| 6,035,585 A | 3/2000 | Boyd |
| 6,092,962 A | 7/2000 | Lee |
| 6,112,935 A | 9/2000 | Shackelford |
| 6,129,838 A | 10/2000 | Millner |
| 6,158,184 A | 12/2000 | Timmerman, Sr. et al. |
| 6,203,245 B1 | 3/2001 | Harten |
| 6,244,004 B1 | 6/2001 | Timmerman, Sr. et al. |
| 6,250,850 B1 | 6/2001 | Price et al. |
| 6,253,518 B1 | 7/2001 | Azar |
| 6,277,274 B1 | 8/2001 | Coffman |
| 6,287,054 B1 | 9/2001 | Egan et al. |
| D454,203 S | 3/2002 | Bellavance |
| 6,361,248 B1 | 3/2002 | Maestro |
| 6,364,571 B1 | 4/2002 | Doolaege |
| 6,393,774 B1 | 5/2002 | Fisher |
| 6,401,400 B1 | 6/2002 | Elliott |
| 6,422,788 B1 | 7/2002 | Hartman |
| 6,467,995 B2 | 10/2002 | Bevilacqua et al. |
| D465,284 S | 11/2002 | Brown |
| D466,288 S | 11/2002 | Hammer |
| 6,491,473 B2 | 12/2002 | Veazey |
| 6,493,996 B1 | 12/2002 | Alexander et al. |
| 6,557,818 B2 | 5/2003 | Manthci |
| D477,091 S | 7/2003 | Manthei |
| D477,419 S | 7/2003 | Manthei |
| D479,002 S | 8/2003 | Nordstrand |
| D479,003 S | 8/2003 | Nordstrand |
| 6,626,609 B1 * | 9/2003 | Kotani ............ E03F 1/002 210/170.03 |
| 6,648,549 B1 | 11/2003 | Urriola |
| 6,652,196 B1 | 11/2003 | Rainey |
| 6,679,656 B1 | 1/2004 | Manthei |
| D486,246 S | 2/2004 | Manthei |
| 6,695,544 B2 | 2/2004 | Knudson et al. |
| 6,779,946 B1 | 8/2004 | Urriola |
| 6,939,077 B1 | 9/2005 | Hart |
| 6,942,424 B2 | 9/2005 | Charon |
| 6,962,463 B2 | 11/2005 | Chen |
| 6,991,402 B2 | 1/2006 | Burkhart |
| 7,022,243 B2 | 4/2006 | Bryant |
| 7,080,956 B2 | 7/2006 | Neden et al. |
| 7,131,161 B2 | 11/2006 | Lee |
| 7,160,058 B2 | 1/2007 | Burkhart |
| 7,168,884 B2 | 1/2007 | Hart |
| 7,182,874 B2 | 2/2007 | Allard et al. |
| 7,198,432 B2 | 4/2007 | Chen |
| 7,207,748 B1 | 4/2007 | Urban |
| 7,251,920 B2 | 8/2007 | Timmerman, Sr. et al. |
| 7,344,335 B2 | 3/2008 | Burkhart |
| 7,506,479 B2 | 3/2009 | Pryor |
| 7,544,014 B1 | 6/2009 | Bergmann |
| 7,833,413 B1 * | 11/2010 | Rotondo ............ E03F 1/002 210/170.03 |
| 7,896,582 B2 | 3/2011 | Chouery |
| 8,028,713 B2 | 10/2011 | Takai |
| D654,693 S | 2/2012 | Freeman |
| 8,113,740 B2 | 2/2012 | Boulton et al. |
| 8,136,260 B2 | 3/2012 | Jones |
| 8,157,991 B2 * | 4/2012 | Wilhelms ............ E03F 1/002 210/170.03 |
| 8,360,100 B2 | 1/2013 | Burkhart et al. |
| 8,684,635 B2 | 4/2014 | Rainey |
| 8,985,897 B2 | 3/2015 | Boulton et al. |
| 9,157,211 B2 | 10/2015 | Hiester |
| 9,458,594 B2 | 10/2016 | Brookhart et al. |
| 9,469,963 B2 | 10/2016 | Hiester |
| 9,546,044 B2 | 1/2017 | Boulton et al. |
| 2001/0019684 A1 | 9/2001 | Manthei et al. |
| 2003/0012608 A1 | 1/2003 | Race |
| 2003/0136075 A1 | 7/2003 | Brackett |
| 2004/0052588 A1 | 3/2004 | Keshmiri |
| 2005/0262778 A1 | 12/2005 | Allen et al. |
| 2006/0169648 A1 | 8/2006 | Fitzgerald |
| 2007/0031192 A1 | 2/2007 | Murfin |
| 2007/0181197 A1 | 8/2007 | Krichten et al. |
| 2008/0085162 A1 | 4/2008 | Blundell |
| 2008/0104909 A1 | 5/2008 | Wallin |
| 2008/0163577 A1 | 7/2008 | Rhodes et al. |
| 2008/0251448 A1 | 10/2008 | Kent |
| 2010/0325819 A1 | 12/2010 | Abreu |
| 2011/0052318 A1 | 3/2011 | Srnith et al. |
| 2011/0192097 A1 | 8/2011 | Kelley, Jr. |
| 2012/0111866 A1 | 5/2012 | Freeman |

(56) References Cited

U.S. PATENT DOCUMENTS

| | | | |
|---|---|---|---|
| 2012/0204508 | A1 | 8/2012 | Kalwara |
| 2014/0124424 | A1* | 5/2014 | Chai ..................... E03F 5/101 210/170.03 |
| 2014/0270990 | A1 | 9/2014 | Heraty |
| 2014/0314501 | A1 | 10/2014 | Usagani |

FOREIGN PATENT DOCUMENTS

| | | |
|---|---|---|
| EP | 1818463 | 8/2007 |
| GB | 944064 | 12/1963 |
| GB | 2014212 | 8/1979 |
| GB | 2084227 | 4/1982 |
| GB | 2124277 | 2/1984 |
| JP | 59-126833 | 7/1984 |
| JP | 04-007432 | 1/1992 |
| JP | 05-263458 | 10/1993 |
| JP | 07-003861 | 1/1995 |
| JP | 07-216970 | 8/1995 |
| JP | 07-252870 | 10/1995 |
| JP | 08-004343 | 1/1996 |
| JP | 08-120746 | 5/1996 |
| JP | 09-125468 | 5/1997 |
| JP | 07-189330 | 7/1997 |
| JP | 10-204968 | 8/1998 |
| JP | 11-178186 | 7/1999 |
| JP | 11-190058 | 7/1999 |
| JP | 2000-008467 | 1/2000 |
| JP | 2001-123519 | 5/2001 |
| JP | 2002-021170 | 1/2002 |
| JP | 2002-138561 | 5/2002 |
| WO | WO 87/001406 | 3/1987 |
| WO | WO 95/12034 | 5/1995 |
| WO | WO 96/011309 | 4/1996 |
| WO | WO 2006/032090 | 3/2006 |

OTHER PUBLICATIONS

"Aquaflow® permeable block paving and SUDS. Formpave", Hanson Website, as early as Jul. 12, 2006, available at http://www.heidelbergcement.com/uk/en/hanson/products/block_paving_and_suds/permeable_paving_and_SUDS/aquaflow_permeable_block_paving_and_suds.htm, pp. 1-2, printed on Jun. 3, 2009.
"Block paving and SUDS. Formpave", Hanson Website, as early as Jul. 12, 2006, available at http://www.heidelbergcement.com/uk/en/hanson/products/block_paving_and_suds/block_paving_and_suds_overview.htm, pp. 1-2, printed on Jun. 1, 2009.
"Demonstration: The Stormsaver Rainwater Harvesting System", Stormsaver website, as early as Jun. 9, 2007, available at http://www.stormsaver.com/default.asp?pid=13, p. 1, printed Jun. 1, 2009.
"Education pack: The Stormsaver Rainwater Harvesting System", Stormsaver website, as early as Jun. 9, 2007, available at http://www.stormsaver.com/default.asp?pid=31, pp. 1-2, printed on Jun. 1, 2009.
"Features", FreeFlo Water Recycling Systems website, as early as Aug. 22, 2006, available at http://www.freeflowater.com/features.html, pp. 1-2, printed on Dec. 2, 2008.
"Formpave Image Gallery", Hanson Website, as early as Jul. 12, 2006, available at http://www.heidelbergcement.com/uk/en/hanson/products/block_paving_and_suds/formpave_image_gallery.htm, pp. 1-4, printed on Jun. 3, 2009.
"Formpave Q24 Sustainable Urban Drainage System", Hanson website, as early as, available at http://www.heidelbergcement.com/NR/rdonlyres/873FFE50-10CF-4ADE-B5AE-F3A389FE9023/0/q24.pdf, p. 1, printed on Jun. 1, 2009.
"FreeFlo Water Recycling Systems home page," as early as Aug. 22, 2006, available at http://www.freeflowater.com/features.html, pp. 1-2, printed on Dec. 2, 2008.
"Future water strategy. Formpave", Hanson Website, as early as Jul. 12, 2006, available at http://www.heidelbergcement.com/uk/en/hanson/products/block_paving_and_suds/future_water_strategy.htm, p. 1, printed on Jun. 1, 2009.
"How FreeFlo Water Recycling Systems Work", FreeFlo Water Recycling Systems website, as early as Aug. 22, 2006, available at http://www.freeflowater.com/how_it_works.html, pp. 1-2, printed on Dec. 2, 2008.
"How is a System Designed?" Stormsaver website, as early as Jun. 9, 2007, available at http://www.stormsaver.com/default.asp?pid=2, p. 1, printed on Jun. 1, 2009.
"Installation: The Stormsaver Rainwater Harvesting System", as early as Jun. 9, 2007, available at http://www.stormsaver.com/default.asp?pid=6, p. 1, printed on Jun. 1, 2009.
"Photo Gallery", FreeFlo Water Recycling Systems website, as early as Aug. 22, 2006, available at http://www.freeflowater.com/gallery.html, pp. 1-4, printed on Dec. 2, 2008.
"Potable Water Tanks." HTI Systems, LLC, printed Apr. 19, 2012 from http://www.wedotanks.com/potable-water-tanks.asp.
"Precast Concrete Modular Storm Water Detention", StormTrap® website, as early as Mar. 23, 2008, available at http://www.stormtrap.com/, pp. 1-2, printed on Aug. 29, 2007.
"Retaining Walls," Section 5, Caltrans Bridge Design Specifications, Aug. 2004, pp. 1-106.
"Retaining Walls," WisDOT Bridge Manual, Chapter 14, Jul. 2013, 258 pages.
"Stormsaver: Rainwater Harvesting in Commercial Buildings", Stormsaver website, as early as Jun. 9, 2007, available at http://www.stormsaver.com/default.asp?pid=7, p. 1, printed on Jun. 1, 2009.
"Stormsaver: Rainwater Harvesting in Housing Developments", Stormsaver website, as early as Jun. 9, 2007, available at http://www.stormsaver.com/default.asp?pid=10, pp. 1-2, printed on Jun. 1, 2009.
"Substructures," NDOT Structures Manual, Chapter 18, Sep. 2008, 24 pages.
"SWPPP for Drivers Stormwater Pollution Prevention Plans", Sierra Ready Mix Website, as early as May 3, 2001, available at http://www.sierrareadymix.com/swpp.htm, pp. 1-2, printed on Nov. 19, 2008.
"The Stormsaver System", Stormsaver website, as early as Jun. 9, 2007, available at http://www.stormsaver.com/default.asp?pid=30, p. 1, printed Jun. 1, 2009.
"The Two-Piece Box Cilvert", Precast Solutions Magazine on precast.org website, as early as Mar. 9, 2007, available at http://www.precast.org/publications/solutions/2006_fall/two_culvert.htm, pp. 1-3, printed on Jun. 1, 2009.
"Water harvesting system components details. Formpave", Hanson Website, as early as Jul. 12, 2006, available at http://www.heidelbergcement.com/uk/en/hanson/products/block_paving_and_suds/water_harvesting/water_harvesting_system_components.htm, pp. 1-2, printed on Jun. 1, 2009.
"Water harvesting system details. Formpave", Hanson Website, as early as Jul. 12, 2006, available at http://www.heidelbergcement.com/uk/en/hanson/products/block_paving_and_suds/water_harvesting/water_harvesting_system_details.htm, p. 1, printed on Jun. 1, 2009.
"Welcome to RainEscape-SE", RainEscape website, as early as 2008, available at http://www.rainescape-se.com/, p. 1, printed on Dec. 2, 2008.
"Welcome to Stormsaver Rainwater Harvesting Systems!", Stormsaver website, as early as Feb. 28, 2004, available at http://www.stormsaver.com/, pp. 1-2, printed on Jun. 1, 2009.
"What Exactly is Rainwater Recovery?", Stormsaver website, as early as Jun. 9, 2007, available at http://www.stormsaver.com/default.asp?pid=25, p. 1, printed on Jun. 1, 2009.
Ashford et al., "Seismic Response and Capacity Evaluation of Exterior Sacrificial Shear Keys of Bridge Abutments," 2009 Caltrans-PEER Seismic Seminar Series, 17 pages.
Bowles, "Mechanically Stabilized Earth and Concrete Retaining Walls," in Foundation Anaysis and Design, McGraw Hill Book Co., New York, 5th ed, 2009, pp. 552-553.
Prieto-Portar, "Types of Retaining Walls," Foundation Engineering Lecture #23, 2008, available at www.sefindia.org/rangarajan/retainingWalls.pdf, 76 pages.

(56) References Cited

OTHER PUBLICATIONS

Spatz "Reading water authority takes huge underground tank out of service for cleaning." readingeagle.com, Oct. 4, 2008, 3 pages.

* cited by examiner

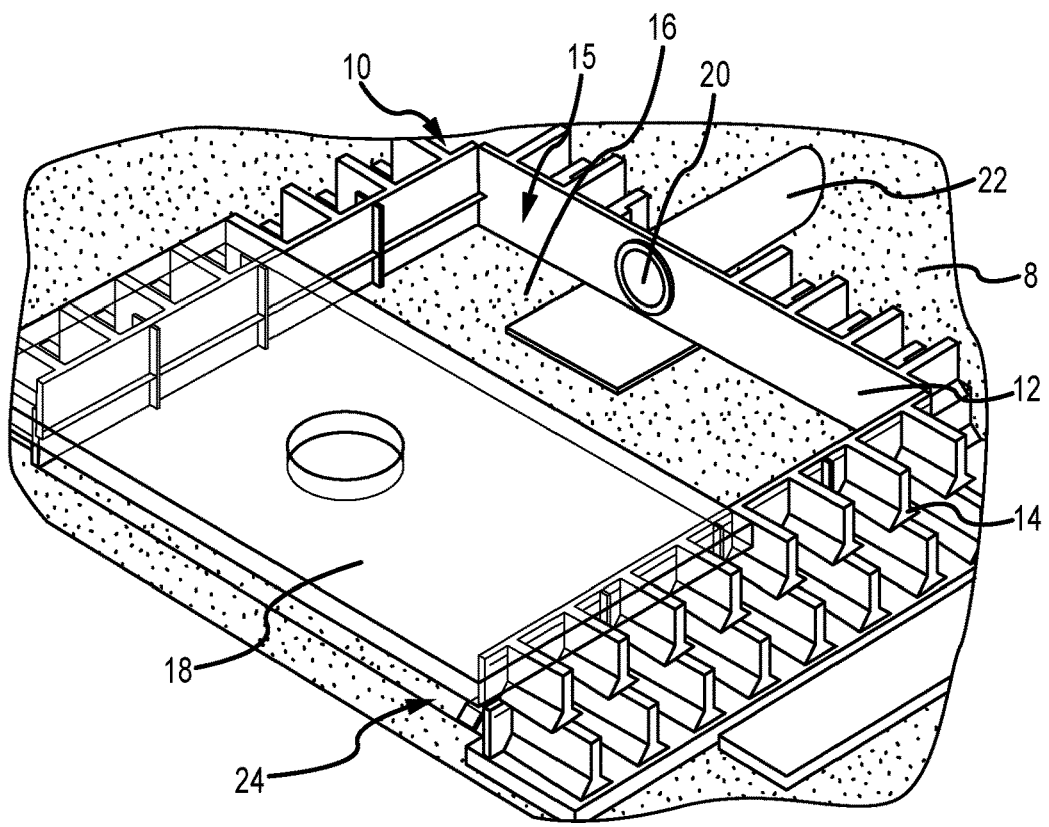
FIG.3
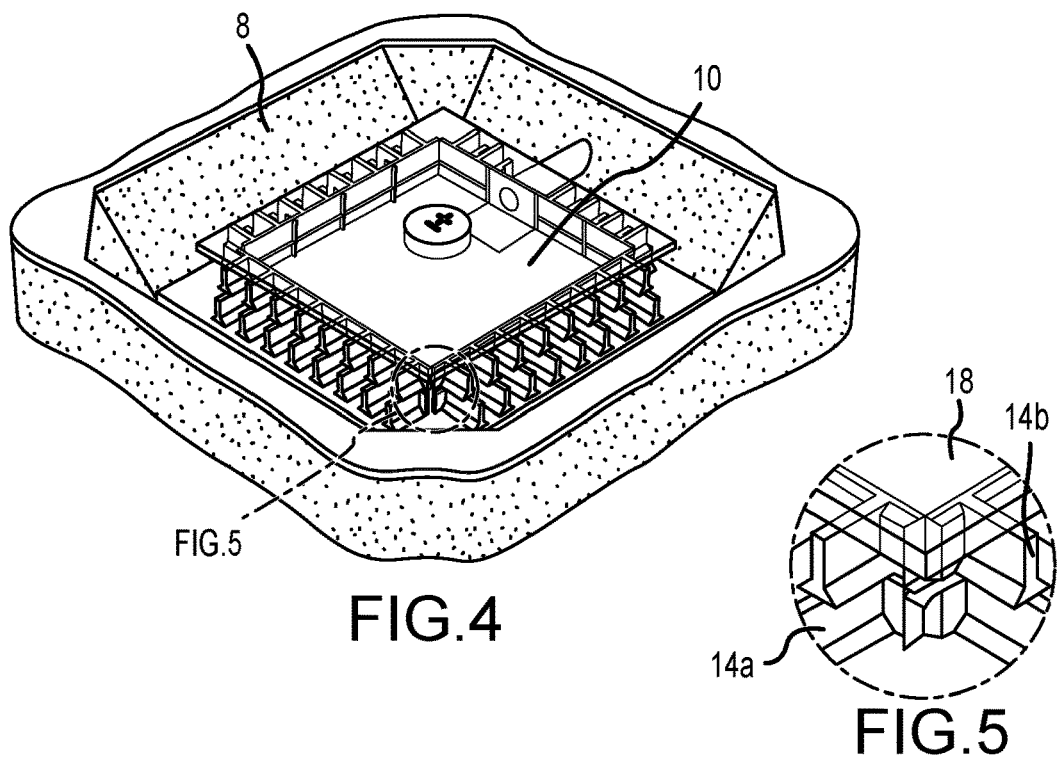
FIG.4
FIG.5

INTEGRATED RETAINING WALL AND FLUID COLLECTION SYSTEM

This U.S. Non-Provisional patent application claims the benefit of priority from U.S. Patent Application Ser. No. 62/520,284, filed Jun. 15, 2017, the entire disclosure of which is hereby incorporated by reference.

FIELD

The present disclosure relates generally to fluid collection and storage systems. Specifically, certain embodiments of the present disclosure relate to subgrade or subterranean fluid collection and storage systems and integrated retaining walls. Preferred embodiments of the present disclosure provide one or more retaining wall features provided as boundary members and/or support structures for fluid collection and storage systems.

BACKGROUND

Storm water collection systems are commonly used to capture excess rain and ground water from a variety of surfaces including, paved streets, parking lots, sidewalks, and roofs. Typically, storm water collection systems receive water from street gutters, grates, or drains and vary in size. Conventional storm water collection systems simply gather the excess water and discharge it into a river, lake, canal, reservoir, ocean, dry well, or other recharge basin. Often, however, the amount of water will overwhelm the storm water collection system, which causes backups and localized flooding. Further, due to the scarce availability of water in many arid climates, the retention and use/redistribution of water is becoming a preferable alternative. Thus, it would be advantageous to provide a storm water retention system that prevents flooding and/or storm water waste by treating, storing, and later utilizing the water for other purposes.

Known retaining wall structures, including those disclosed in U.S. Pat. No. 4,824,293 to Brown et al., which is hereby incorporated by reference in its entirety, fail to disclose various features of the present disclosure. Brown et al. provide an elongated slit on one side of a panel, but fail to disclose various features of the present invention as shown and described herein, including fluid collection modules or units, anchor members, and attachment means of the present invention.

U.S. Pat. No. 4,668,129 to Babcock et al., U.S. Pat. No. 5,308,195 to Hotek, and U.S. Pat. No. 6,652,196 to Rainey, which are hereby incorporated by reference in their entireties, similarly fail to disclose various novel features, devices, and methods of the present invention. For example, known devices and systems fail to provide methods and systems for fast and secure connection of tiebacks to a wall panel while reducing risk of damaging or spalling the panel.

U.S. Pat. No. 9,546,044 to Boulton et al., is a Continuation-in-Part of U.S. Pat. No. 8,985,897, which is a Continuation-in-Part of U.S. Pat. No. 8,113,740, all of which are hereby incorporated by reference in their entireties, relate to methods and systems for capturing and distributing storm water. Various features taught and described by Boulton et al. are contemplated for use with embodiments of the present disclosure. Modules and drainage systems as taught by Boulton et al. are contemplated for use with the present disclosure, including systems for channeling and collecting fluid, and for providing structural support to elements of the present disclosure including, for example, supporting a cover member as shown and described herein.

U.S. Pat. No. 9,458,594 to Brookhart et al., which is hereby incorporated by reference in its entirety, discloses a method and system for a retaining wall and associated components. Various features and elements of Brookhart et al. are contemplated for use with embodiments of the present disclosure.

U.S. Pat. No. 9,157,211 to Hiester, which is hereby incorporated by reference in its entirety, discloses a cantilevered wing wall. Various features taught by Hiester are contemplated for use with embodiments of the present disclosure.

U.S. Pat. No. 8,684,635 to Rainey, which is hereby incorporated by reference in its entirety, discloses a precast wall system. Various features of Rainey may be provided in embodiments of the present disclosure including, for example, retaining wall portions of the present disclosure.

Embodiments of the present disclosure are contemplated as comprising and including pumps and distribution systems for transferring fluid out of (or within) the system. In some embodiments, systems of the present disclosure are devoid of pumps and are contemplated as comprising settling ponds or passive/gravity fed systems.

SUMMARY

There has been a long-felt and unmet need to provide methods, systems and devices that combine benefits and features of fluid collection and storage systems with retaining wall systems.

Embodiments of the present disclosure are directed to underground or subgrade water retention, detention, infiltration, and/or storage systems with integrated retaining wall features. In some embodiments, systems of the present disclosure utilize perimeter soil retention precast concrete members with an overlay of precast concrete slabs to capture fluid (e.g. water from a weather event).

In some embodiments, it is contemplated that a lower or bottom portion of a system comprises precast or cast-in-place slabs. The slabs are contemplated as comprising weep holes or apertures to allow for transmission of fluid to a subgrade soil or other material or structure. In alternative embodiments, it is contemplated that systems of the present disclosure comprise open-bottom system wherein a native soils or engineering soils are in direct-contact with the system. Top slabs or upper members are contemplated as comprising weep holes or ports to transmit water directly into a storage area.

In various embodiments, the present disclosure provides fluid storage and collection modules comprising at least one perimeter wall. The perimeter wall(s) may comprise any one or more of the following: mechanically-stabilized earth walls, gravity walls, semi-gravity walls, wing walls, cantilever walls, non-gravity cantilever walls, block walls, soil arch walls, soil friction walls, anchored walls, counterfort walls, and/or various vertical precast wall structures. The perimeter walls are contemplated as acting as internal support walls or columns. Overlaid slabs or upper portions of modules of the present disclosure are contemplated as comprising traditional flat slabs, hollow core slabs, single tees, double tees, beam supported slabs, post-tensioned slabs, prestressed slabs, dapped slabs, trideck slabs, voided slabs, and/or bulb tees. Connection members of the present disclosure, including those provided between perimeter walls and/or overlaid slabs are contemplated as comprising keyways, grout or cementitious material, weld plates, bolts, gravity, anchors, dowels, post-tension strands, adhesives, and/or butyl sealants. Various components of the system are contemplated as being fluid-permeable to enable and promote ingress or egress of fluid. Additional features are contemplated as being substantially impermeable so as to hold or retain fluid. Such substantially impermeable features are contemplated as comprising a wrapped waterproof membrane to prevent fluid transmission and/or soil transmission. External coatings, hydrophilic expansive joint sealants, and joint wraps are also contemplated for use in various embodiments of the present disclosure.

The Summary of the Invention is neither intended nor should it be construed as being representative of the full extent and scope of the present disclosure. The present disclosure is set forth in various levels of detail in the Summary as well as in the attached drawings and the Detailed Description and no limitation as to the scope of the present disclosure is intended by either the inclusion or non-inclusion of elements, components, etc. in this Summary. Additional aspects of the present disclosure will become more readily apparent from the Detailed Description, particularly when taken together with the drawings.

BRIEF DESCRIPTION OF THE DRAWINGS

Those of skill in the art will recognize that the following description is merely illustrative of the principles of the disclosure, which may be applied in various ways to provide many different alternative embodiments. This description is made for illustrating the general principles of the teachings of this disclosure and is not meant to limit the inventive concepts disclosed herein.

The accompanying drawings, which are incorporated in and constitute a part of the specification, illustrate embodiments of the disclosure and together with the general description of the disclosure given above and the detailed description of the drawings given below, serve to explain the principles of the disclosure.

FIG. 3 is a detailed perspective view of a fluid storage and collection system and according to one embodiment of the present disclosure.

FIG. 4 is a perspective view of a fluid storage and collection system according to one embodiment of the present disclosure.

FIG. 5 is a detailed perspective view of a fluid storage and collection system according to one embodiment of the present disclosure.

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

DETAILED DESCRIPTION

Figure 1:
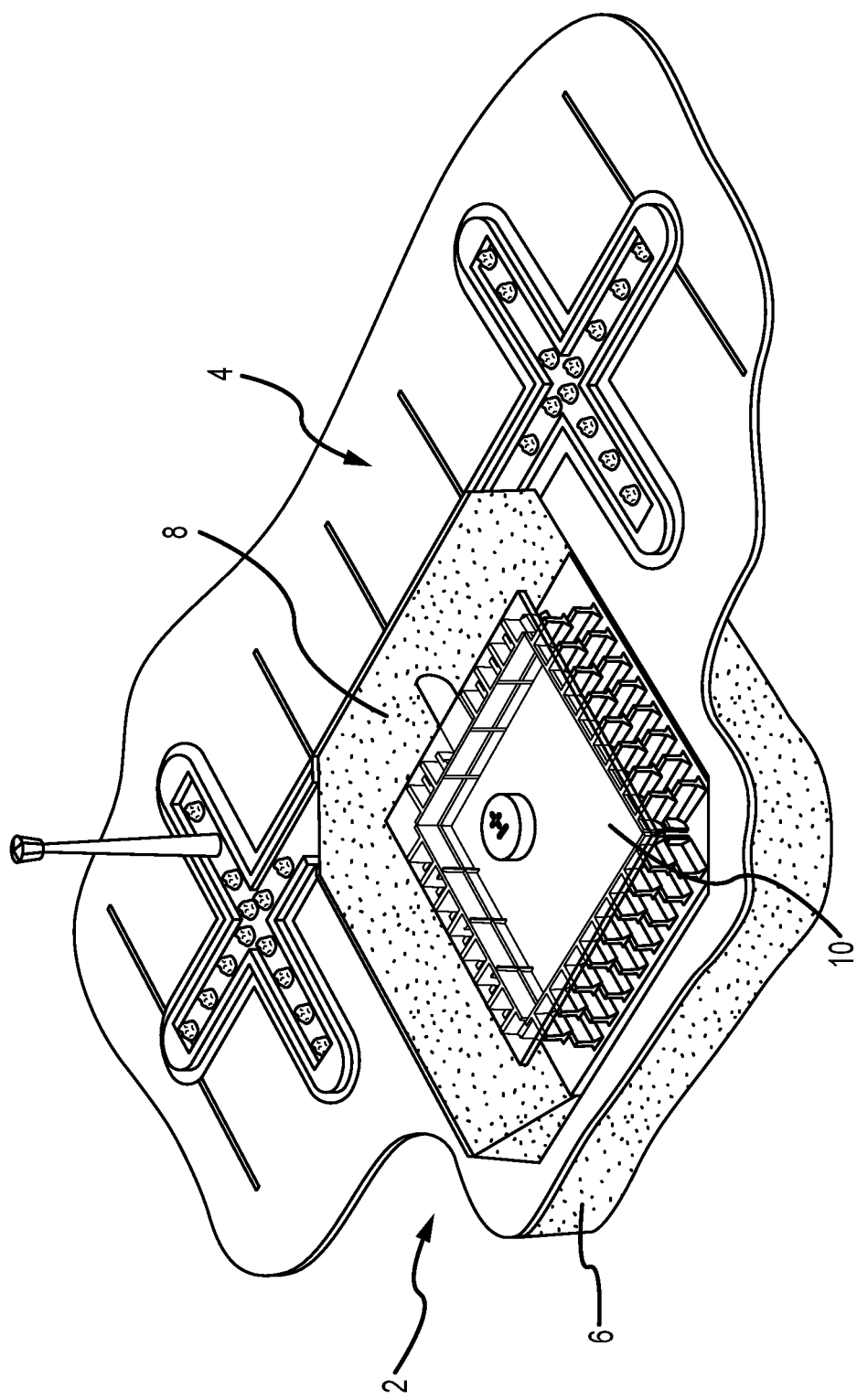
FIG. 1 is a cut-away perspective view of a fluid collection and storage system according to one embodiment of the present disclosure.

FIG. 1 is a cut-away perspective view of a fluid collection and storage system 2 according to one embodiment of the present disclosure. As shown, the system 2 is provided within an above-grade structure 4 comprising a parking lot. The above-grade structure 4 is shown as a parking lot in FIG. 1 for illustrative purposes only. Surface and/or above-grade structures 4 may comprise various features and installations including, but not limited to, parking lots, driveways, sidewalks, unpaved and/or landscaped areas, gravel surfaces, etc. The above-grade structure 4 is provided on or above a substrate 6, which may comprise soil. A void 8 is formed in the substrate and a collection unit or module 10 is provided within the void. The void 8 and the collection unit comprise an internal storage volume and the ability to collect, store, and/or transport fluid including but not limited to rain water. In preferred embodiments, a material or surface that forms the above-grade structure 4 comprises an at least partially-permeable material to permit flow of water and fluid to the collection module 10. The system 2 is also contemplated as comprising drainage devices to collect and convey fluid to the collection module 10. Such devices may include, for example, gutters, storm sewers, perforated piping, etc.

Figure 2:
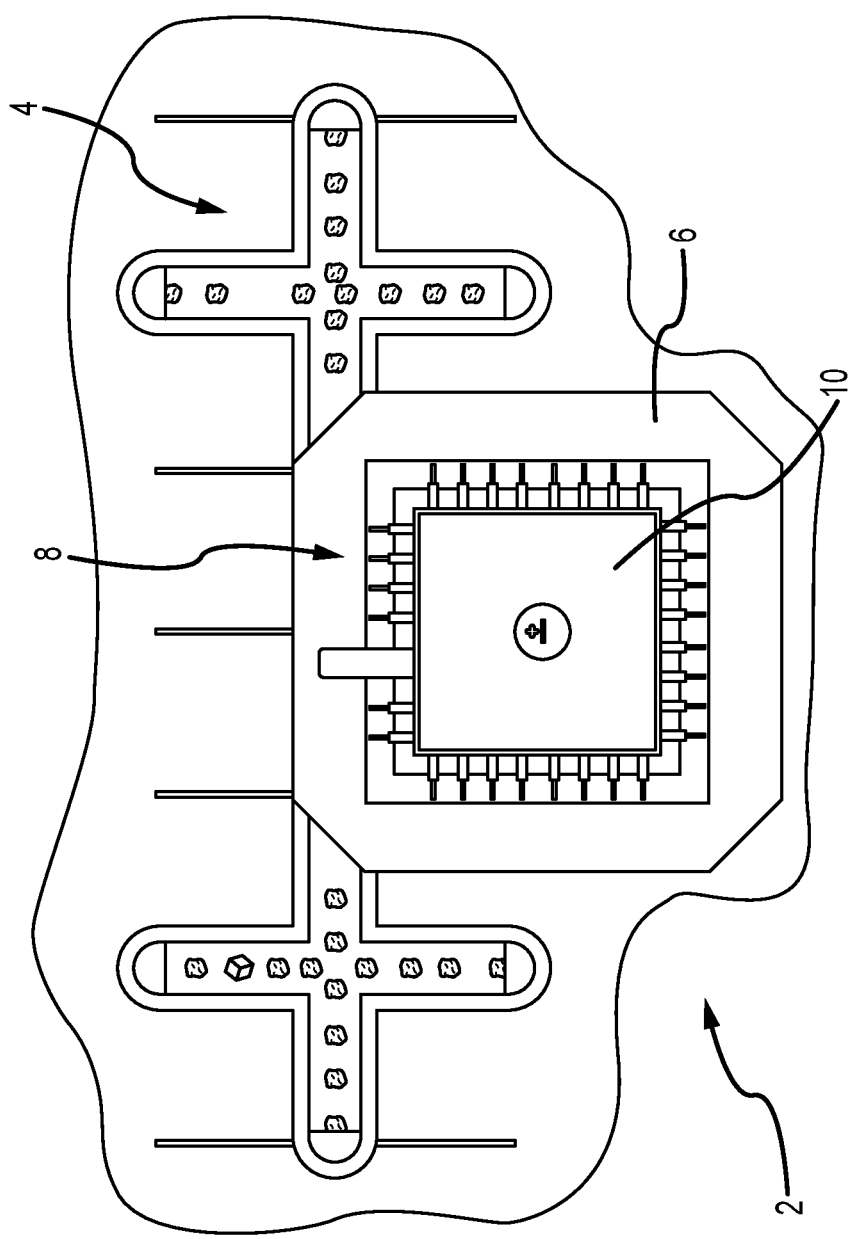
FIG. 2 is a top plan view of a fluid collection and storage system according to one embodiment of the present disclosure.

FIG. 2 is a top plan view of the system 2 shown in FIG. 1. Various features shown and described with respect to FIG. 1 are reproduced in FIG. 2. The system 2 comprises a fluid collection module 10 that may be provided in various dimensions, shapes, etc. In some embodiments, it is contemplated that a collection module 10 comprises a rectilinear device with a footprint of between approximately 100 square feet and approximately 1,000 square feet. It will be recognized, however, that embodiments of the present disclosure are not limited to collection units of any particular size, dimension, or proportion. Additionally, and although only a single collection unit is shown in FIG. 2, it is contemplated that systems in accordance with embodiment of the present disclosure comprise a plurality of collection modules.

FIG. 3 is a perspective view of a fluid collection and storage system 2 according to one embodiment of the present disclosure. As shown, the system 2 of FIG. 3 comprises a collection module 10 provided in a soil or substrate 8. The collection module 10 comprises a plurality of sidewalls 12 having supports 14 and wherein the sidewalls 12 at least partially define an interior volume 16 for fluid collection and storage. A cover member 18 is provided to define an upper limit of the interior volume 16 and, in some embodiments, filter fluid that is transmitted to the interior volume 16. A flow port 20 and associated conduit 22 are provided to permit egress of fluid from the interior volume 16. Depending on system requirements and desired applications, the flow port 20 and conduit 22 may also be used to supply an ingress of water to the interior volume 16 of the collection module 10. As shown in FIG. 3, sidewalls 12 of the system provide first, second and third boundaries or limits of the collection module 10. A fourth side of the collection unit comprises an open portion 24 (as shown in FIG. 3) that is closed or sealed by one or more retaining wall structures as shown and described in more detail herein. In some embodiments, it is contemplated that the module 10 comprises four sidewalls 12 of the type and construction shown in FIG. 3 that enclose four sides of the interior volume 16. Although a single flow port 20 and conduit 22 are provided in the module of FIG. 3, it is contemplated that further embodiments of the present disclosure comprise a plurality of flow ports within the module. For example, in some embodiments, it is contemplated that a plurality of modules 10 as shown in FIG. 3 are provided in series and are in fluid communication with one another by way of at least one conduit 22 and a plurality of flow ports 20.

As shown in FIG. 3, a plurality of supports 14 are provided. The supports of FIG. 3 are provided in a stacked and staggered arrangement to provide support to the sidewalls of the module.

FIG. 4 is a top perspective view of a collection unit or module 10 according to one embodiment of the present disclosure. FIG. 5 is a detailed perspective view of a portion of the collection module shown in FIG. 4. As shown, a cover member 18 of the collection module 10 comprises a plurality of supports 14. A first set of supports 14a are provided as lower supports, and a second set of supports 14b are provided as upper supports, wherein the supports 14a, 14b are preferably provided in a stacked and staggered arrangement. In various embodiments, the cover member 18 comprises an at least partially permeable cover member wherein fluid is allowed to pass through the cover member 18 into an internal storage volume of the collection module 10.

In some embodiments, one or more fluid flow ports or paths are provided between the supports 14 of the module. As shown in FIGS. 1-5, an interior surface 15 of the sidewalls 12 comprise a substantially impermeable surface to retain fluid, such as water.

Figure 6:
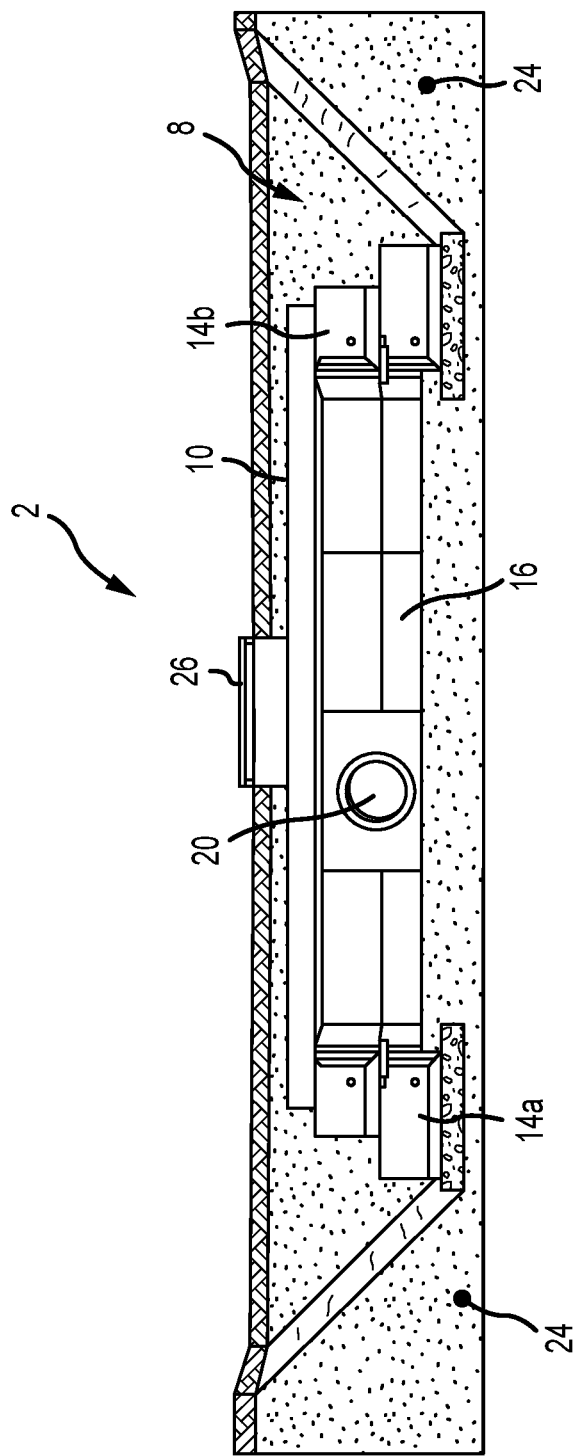
FIG. 6 is a cross-sectional elevation view of a fluid storage and collection system according to one embodiment of the present disclosure.

FIG. 6 is a cross-sectional elevation view of a fluid collection and storage system 2 according to one embodiment of the present disclosure. The system 2 of FIG. 6 comprises various features already described with respect to FIGS. 1-5 and that discussion is incorporated herein with respect to FIG. 6. The system 2 of FIG. 6 comprises at least one module 10 with an internal storage volume 16. An aperture 20 is provided that is operable to serve as either an inlet or, preferably, an outlet for fluid housed within the internal storage volume 16. An access port 26 is provided on the cover member of the module 10. The access port 26 preferably comprises a man-hole type access port to allow for workers and equipment to access the internal volume of the module 10. The access port 26 is also operable to be used as a point of ingress and egress for fluid including, for example, where fluid needs to be pumped out of the system and/or where the aperture 20 is blocked, inoperable, or undesired for use for various reasons. A first set of supports 14a and a second set of supports 14b are shown in elevation, and wherein the second set of supports 14b comprise a shorter length than the first set of supports 14a. The supports of FIG. 6 generally comprise rectilinear members with widened base members or feet. In alternative embodiments, supports are provided that comprise a different geometry or structure but serve essentially the same purpose as those shown in FIG. 6. For example, in some embodiments, supports are provided that comprise triangular elements, angled beams, buttresses, or truss-type supports. The supports of various embodiments of the present disclosure provide structural support to the sidewalls 12 of the module, and at least partially allow the module 10 to hold and support a volume of fluid and the associated stresses and pressures of the fluid.

Figure 7:
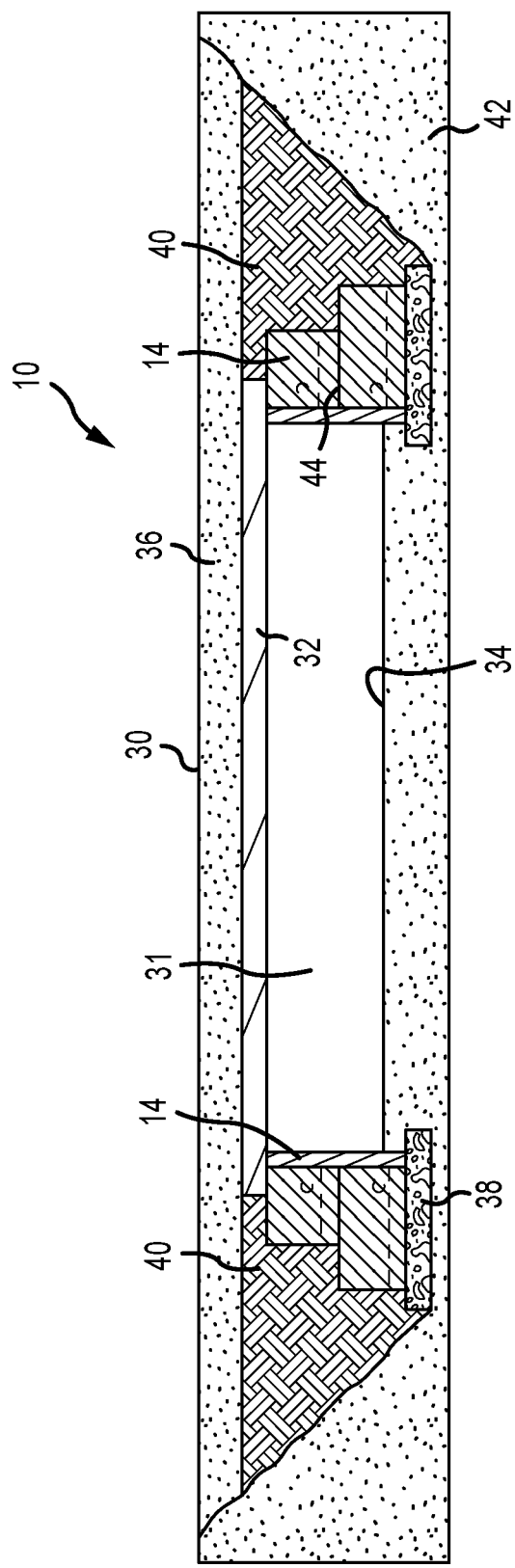
FIG. 7 is a cross-sectional elevation view of a fluid storage and collection system according to one embodiment of the present disclosure.

FIG. 7 is a cross-sectional elevation view of a fluid collection module 10 according to one embodiment of the present disclosure. As shown, the collection module 10 comprises an internal storage volume 31 provided beneath a finished grade 30. A slab cover 36 is provided over a concrete slab 32, which is provided on and at least partially supported by supports 14. The slab cover 36 is contemplated as comprising various heights and/or thicknesses. Supports 14 are preferably positioned on one or more geogrid layers 38 which are provided on and/or within residual soil(s) 42. A backfill material 40 is provided. The backfill material preferably comprises a permeable material to allow fluid to pass therethrough. In some embodiments, the backfill material 40 comprises or functions as a No. 200 sieve for fluid filtration. An interior surface of the storage volume 31 comprises a finished grade 34 as a lower surface that is substantially impermeable to fluid to retain fluid in the internal volume 31 and prevent draining of fluid to and through the substrate or soil 42. A filter fabric 44 is provided at the joints or intersections of the supports 14. In some embodiments, the filter fabric comprises a polypropylene non-woven filter fabric.

Figure 8:
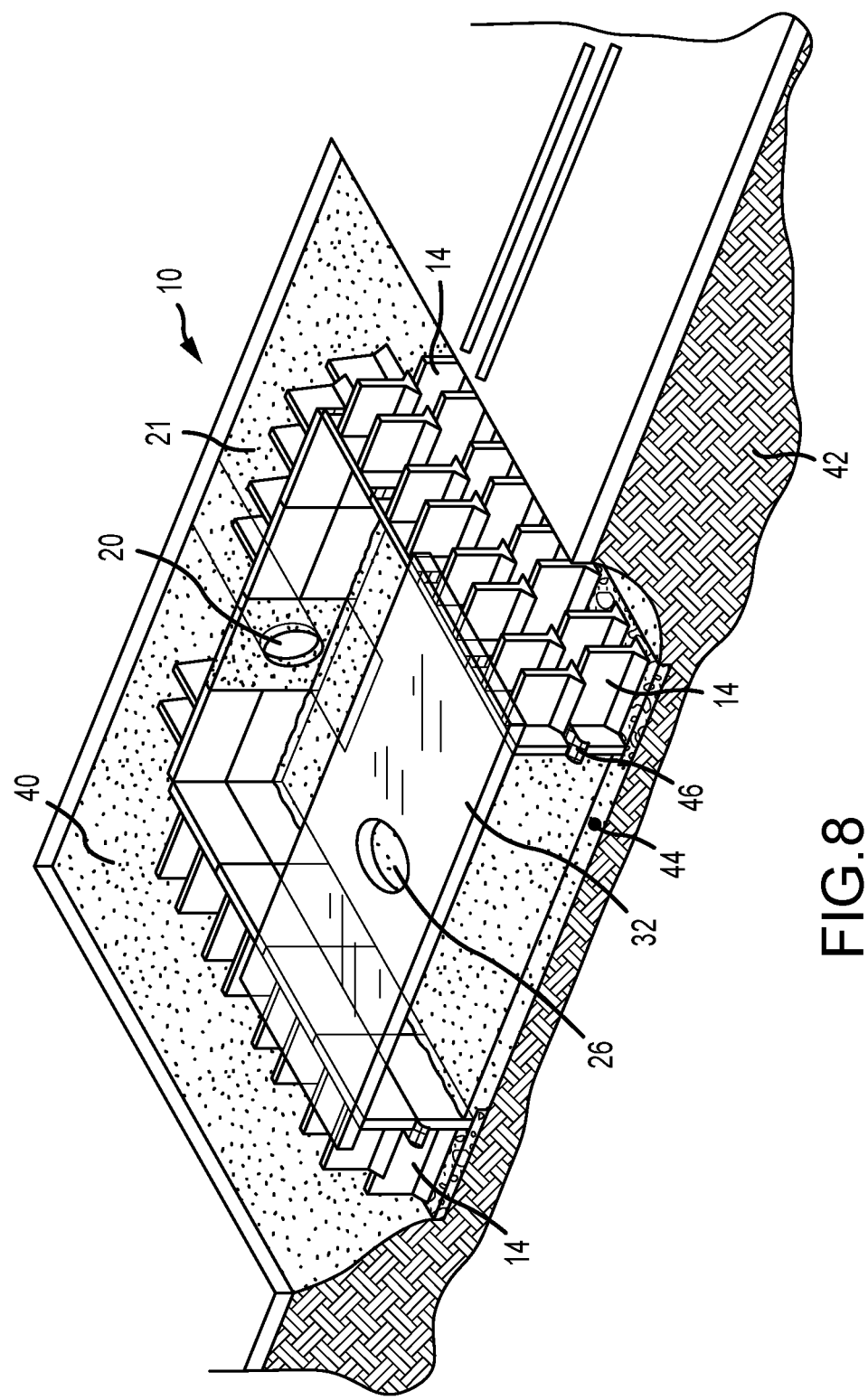
FIG. 8 is a perspective view of a fluid storage and collection system according to one embodiment of the present disclosure.

FIG. 8 is a perspective view of a collection module 10 according to one embodiment of the present disclosure, wherein the module 10 comprises a plurality of supports 14, a concrete slab 32, a backfill material 40 surrounding the module, an aperture 20 interconnected to a storm pipe 21, and a free end 44. The unit 10 is surrounded by residual soils 42. A filter fabric 46 is shown and is contemplated as being provided on, in, or between joints of various support members 14. In some embodiments, a filter fabric is provided that comprises needle-punched non-woven filter fabric provided in or on various joints of the sidewalls and/or supports 14.

Figure 9:
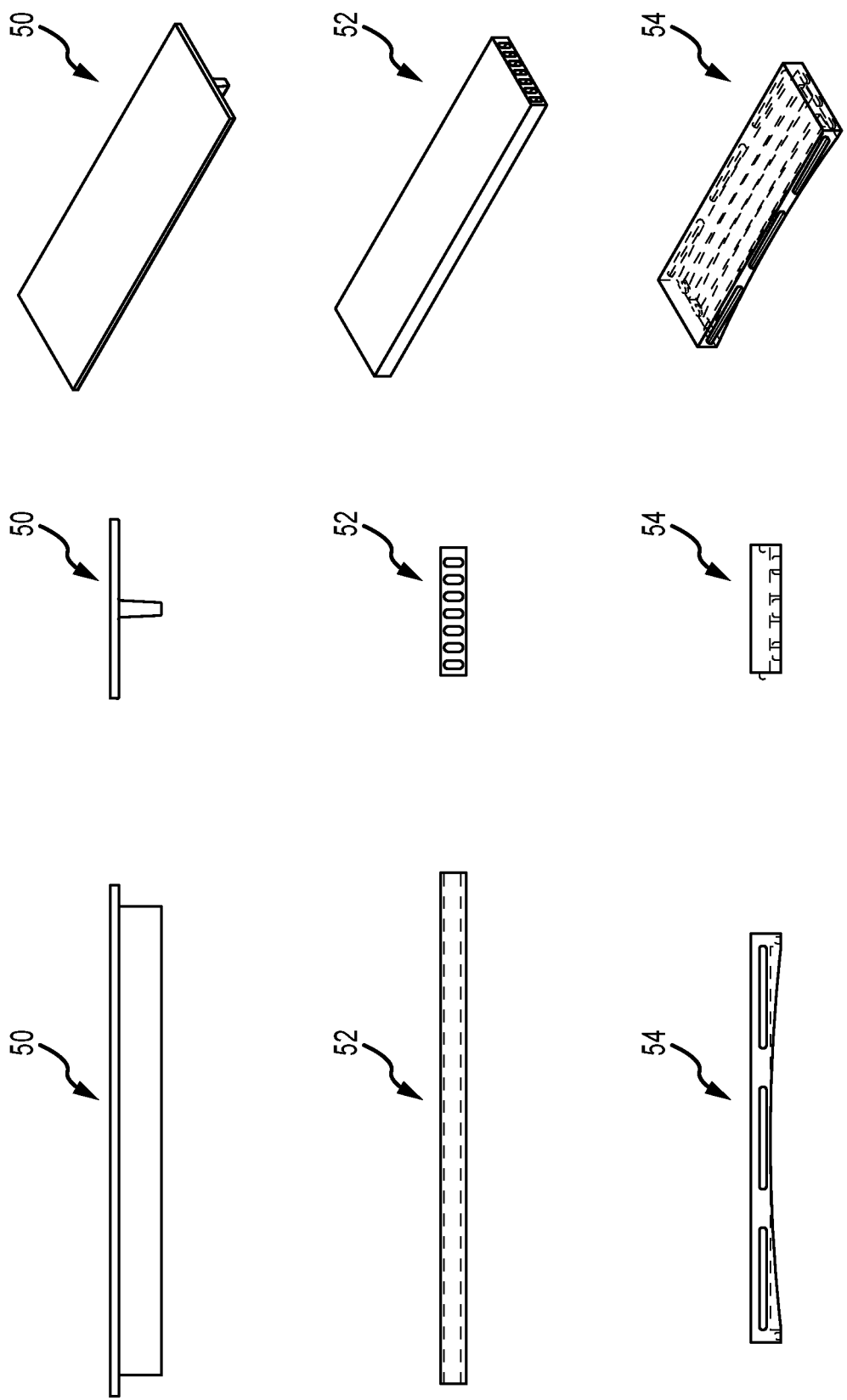
FIG. 9 provides various views of components contemplated for use with fluid collection and storage systems of the present disclosure.

FIG. 9 provides various views of features contemplated for use as upper members or top slabs (See 18 in FIG. 3, for example). As shown in FIG. 9, a top slab of a module 10 of the present disclosure may comprise a dapped singletee 50 (front, side and perspective views shown), a hollow core 52 (front, side and perspective views shown), and/or a semi arch slab 54 (front, side and perspective views shown).

Figure 10:
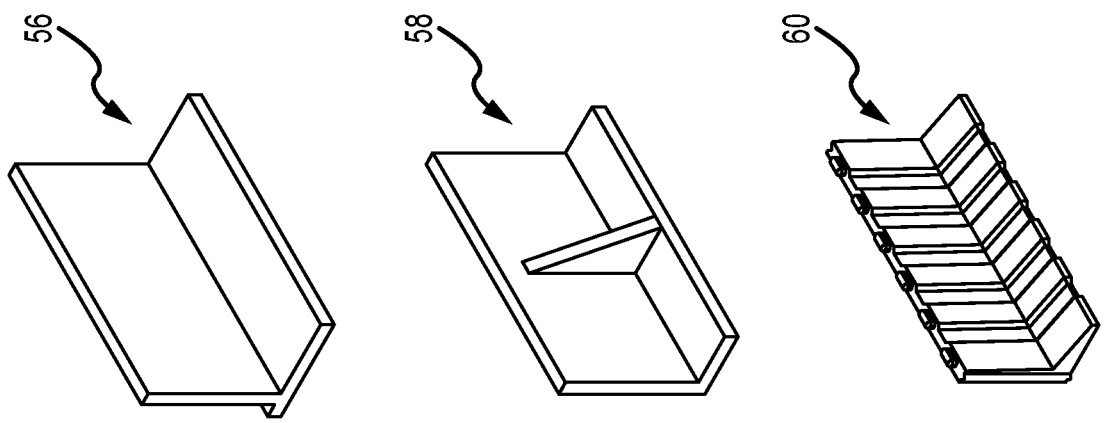
FIG. 10 provides various views of components contemplated for use with fluid collection and storage systems of the present disclosure.
Figure 10:
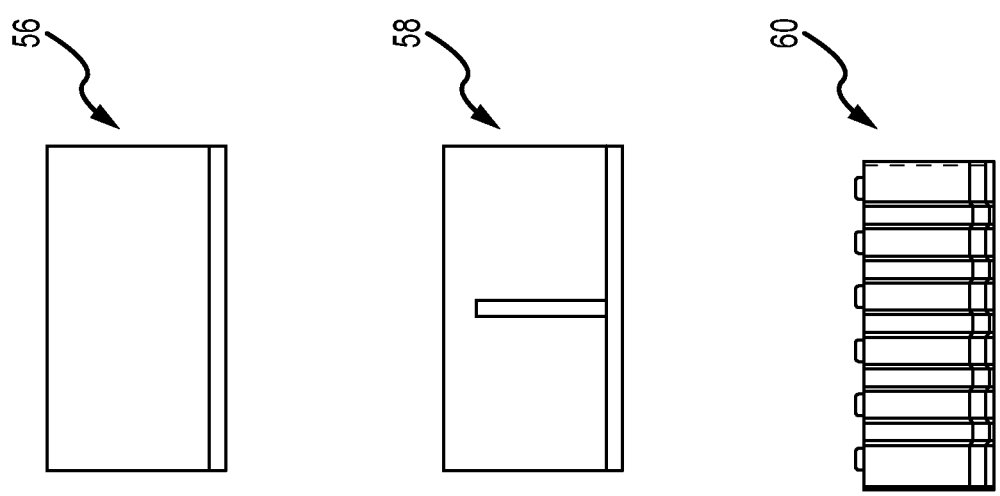
Figure 10:
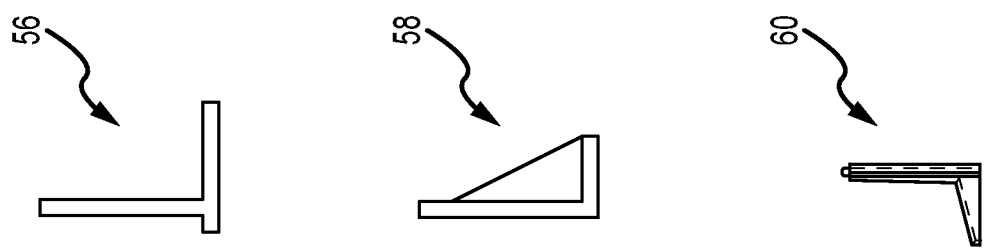

FIG. 10 provides various views of features contemplated for use as support members in modules of the present disclosure (See 14 in FIG. 3, for example). As shown in FIG. 10, a support of a module 10 of the present disclosure may comprise a semi-gravity wall 56 (side, front and perspective views shown), a counterfort wall 58 (side, front and perspective views shown), and/or a precast wall 60 (side, front and perspective views shown).

Figure 11:
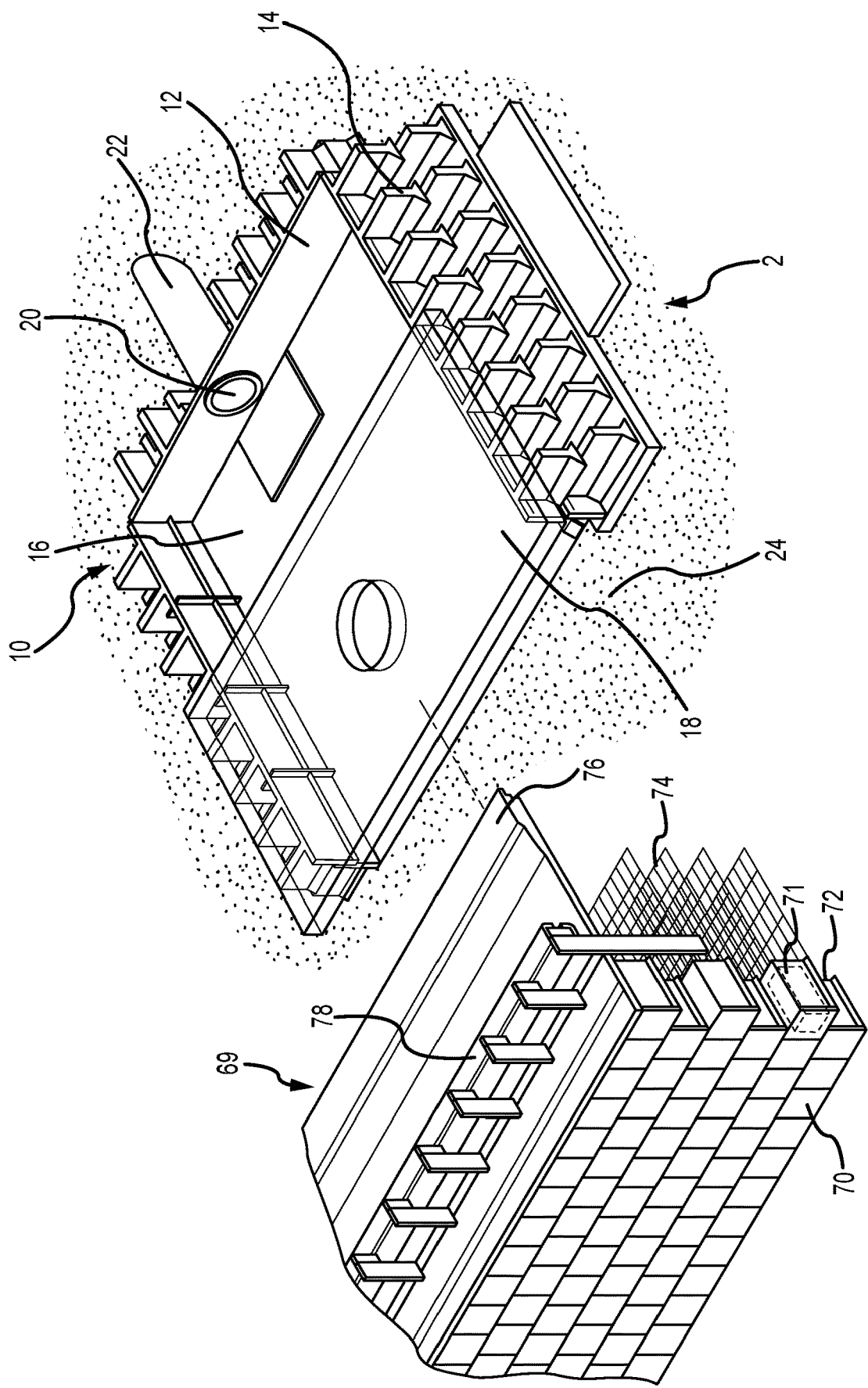
FIG. 11 is an exploded perspective view of a fluid storage and collection system and perimeter retaining wall according to one embodiment of the present disclosure.

FIG. 11 is an exploded perceptive view of a fluid collection and storage system with an integrated retaining wall structure according to one embodiment of the present disclosure. As shown, a fluid collection and storage system 2 is provided. The system 2 comprises a module 10 with a plurality of support members 14 forming a plurality of sides or boundaries of an internal volume of the module. In the embodiment of FIG. 11, the supports 14 are provided as forming three sides of a rectangle. An open portion 24 is provided, and the module 10 is sealed and/or fully formed by the provision of a retaining wall system 69. The retaining wall system 69 of FIG. 11 comprises a plurality of modular retaining wall members 70 and at least one tie-back or anchor member 74. In certain embodiments of the present disclosure, an internal surface 72 of the retaining wall 69 is operable to contact and seal the open portion 24 of the module 10. It will be recognized that as used herein the term "open portion" generally refers to the portion of the module 10 that is open prior to completing construction of the integrated system including the module 10 and a retaining wall system 69. In a final form, the open portion 24 is not open, but is sealed by the retaining wall components.

In some embodiments, an anchor member 74 extends into at least one of an underlying soil or substrate beneath or surrounding a module to provide support to the retaining wall 69. It is also contemplated that at least one anchor member 74 extends through a portion of the module. For example, an anchor member 74 is contemplated as extending between supports 14 and being secured by the supports 14. The anchor member(s) 74 may comprise a geogrid sheet with multiple points of attachment to the supports 14 and/or other components of the module 10.

Various features may be provided in combination with the retaining wall system 69. In FIG. 11, a guardrail 78 is shown. Various other features including, but not limited to, tree boxes, filters, flow meters, pumps, and other structures may extend above grade and be connected to the retaining wall system 69.

As shown in FIG. 11, it is contemplated that at least some of the retaining wall members 70 comprise voids 71. Voids 71 are contemplated as being provided to reduce the weight of the members and the weight of the overall structure.

Figure 12:
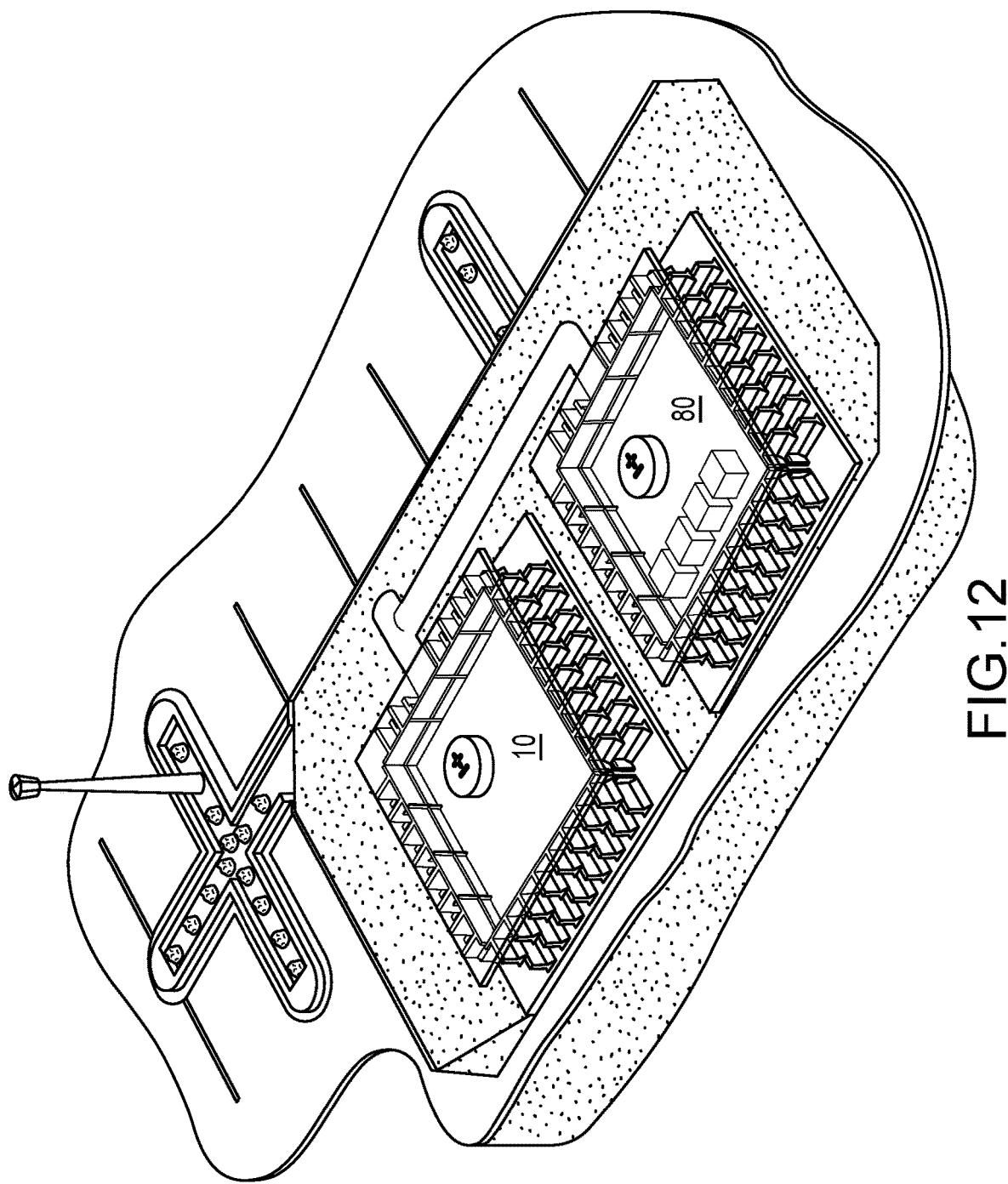
FIG. 12 is a perspective view of a fluid collection and storage system according to another embodiment of the present disclosure.

FIG. 12 is a perspective view of a fluid collection and storage system according to another embodiment of the present disclosure. As shown, the system comprises a first module 10 that is in fluid communication with an additional module 80. The additional module 80 is connected in series with the first module 10 and comprises substantially the same construction as the first module 10. Embodiments of the present disclosure contemplate that any number of modules be provided in a system based on user preferences and the amount of fluid (e.g. rainfall) the system is expected to be exposed to. In some embodiments, the modules are not in fluid communication with one another. For example, it is contemplated that more than one module is provided in a system and at least some of the modules comprise stand-alone fluid collection systems.

As will be recognized by one of ordinary skill in the art, retaining wall systems typically require or benefit from proper drainage to prevent a pressure head from building up and jeopardizing the structural integrity of the wall. Draining is typically achieved by providing a French drain or similar device that simply conducts fluid through an outlet in a front of the wall. In embodiments of the present disclosure, fluid is conveyed from an area behind the wall directly into a module 10. Fluid may be conveyed away from the module 10 by an outlet aperture 20 as shown and described herein. By conveying or channeling fluid to the module, static pressure is prevented from building up behind the wall 69 and a seamless, aesthetically pleasing outer surface of the wall 69 is maintained.

Various features of the present disclosure are shown and described with respect to one or more particular embodiments. It should be recognized, however, that devices and features shown and described herein are not limited to particular embodiment. Rather, features of the present disclosure may be interchanged and/or provided with any of the embodiments disclosed herein, even if not expressly contemplated or shown in a particular Figure.

While various embodiments of the present disclosure have been described in detail, it is apparent that modifications and alterations of those embodiments will occur to those skilled in the art. However, it is to be expressly understood that such modifications and alterations are within the scope and spirit of the present disclosure. Further, the invention(s) described herein are capable of other embodiments and of being practiced or of being carried out in various ways. In addition, it is to be understood that the phraseology and terminology used herein is for the purposes of description and should not be regarded as limiting. The use of "including," "comprising," or "adding" and variations thereof herein are meant to encompass the items listed thereafter and equivalents thereof, as well as, additional items.

What is claimed is:

1. A fluid collection and storage system comprising:
a module having a substantially horizontally disposed roof portion and a plurality of vertically disposed sidewalls, the module comprising an interior volume;
a layer of drainage-enhancing medium positioned above the module;
a permeable backfill material provided along at least one side of the module;
the module comprising at least one flow port to allow ingress and egress of a liquid;
a modular retaining wall assembly comprising a plurality of modular retaining wall members;
the modular retaining wall assembly comprising an inner face adapted for retaining at least one of a fill material and a fluid;
the modular retaining wall assembly comprising an anchor member comprising a first end and a distal end, the first end being secured to the modular retaining wall and the distal end extending toward the module; and
wherein an interior surface of the modular retaining wall assembly comprises a boundary of the interior volume of the module.

2. The fluid collection and storage system of claim 1, wherein the vertically disposed sidewalls are operable to be assembled in a stacked arrangement to form a retaining wall of a desired orientation.

3. The fluid collection and storage system of claim 1, wherein at least some of the plurality of modular retaining wall members comprise voids, and wherein the voids are operable to reduce the weight of the modular retaining wall members or provide a conduit for directing fluid.

4. The fluid collection and storage system of claim 1, wherein the module further comprises a filter fabric operable to filter fluids prior to entering the interior volume of the module.

5. The fluid collection and storage system of claim 4, wherein the filter fabric comprises a needle-punched nonwoven filter fabric.

6. The fluid collection and storage system of claim 1, wherein the module comprises a cover in the form of a slab that is provided on and at least partially supported by the vertically disposed sidewalls of the module.

7. The fluid collection and storage system of claim 1, wherein the anchor member of the modular retaining wall assembly extends through a portion of the module.

8. A fluid collection and storage system comprising:
a containment module having a substantially horizontally disposed roof portion and a plurality of vertically disposed sidewalls, the containment module comprising an interior volume;
a layer of drainage-enhancing medium positioned above the containment module;

a permeable backfill material provided along at least one side of the containment module;

the containment module comprising at least one flow port to allow ingress and egress of a liquid;

a modular retaining wall assembly comprising a plurality of modular retaining wall members;

at least some of the plurality of modular retaining wall members comprising an inner face adapted for retaining at least one of a fill material and a fluid;

wherein at least two of the plurality of vertically disposed sidewalls abut the modular retaining wall assembly and the modular retaining wall assembly at least partially defines the interior volume of the containment module.

9. The fluid collection and storage system of claim 8, wherein the modular retaining wall assembly comprises an anchor member comprised of a first end and a distal end, the anchor member extending from modular retaining wall assembly toward the containment module.

10. The fluid collection and storage system of claim 9, wherein the connecting anchor of the modular retaining wall assembly extends through a portion of the module.

11. The fluid collection and storage system of claim 8, further comprising a plurality of secondary modules provided within the containment module, the secondary modules providing at least one of fluid storage, fluid transport, and structural support to the system.

12. The fluid collection and storage system of claim 8, wherein at least some of the plurality of modular retaining wall members comprise voids, and wherein the voids are operable to reduce the weight of the modular retaining wall members or provide a conduit for directing fluid.

13. The fluid collection and storage system of claim 8, wherein the containment module further comprises a filter fabric operable to filter fluids prior to entering the interior volume of the module.

14. The fluid collection and storage system of claim 13, wherein the filter fabric comprises a needle-punched nonwoven filter fabric.

15. The fluid collection and storage system of claim 8, wherein the module comprises a cover in the form of a slab that is provided on and at least partially supported by the vertically disposed sidewalls of the module.

16. A fluid collection and storage system comprising:

a containment module having a substantially horizontally disposed roof portion and a plurality of vertically disposed sidewalls, the containment module comprising an interior volume;

a layer of drainage-enhancing medium positioned above the containment module;

a permeable backfill material provided along at least one side of the containment module;

the containment module comprising at least one flow port to allow ingress and egress of a liquid;

a modular retaining wall assembly comprising a plurality of modular retaining wall members;

at least some of the plurality of modular retaining wall members comprising an inner face adapted for retaining at least one of a fill material and a fluid;

wherein the modular retaining wall assembly extends between at least two of the vertically disposed sidewalls and at least partially defines the interior volume of the containment module.

17. The fluid collection and storage system of claim 16, wherein roof portion is water-permeable.

18. The fluid collection and storage system of claim 16, wherein the containment module further comprises a filter fabric operable to filter fluids prior to entering the interior volume of the module.

19. The fluid collection and storage system of claim 16, wherein the modular retaining wall assembly comprises a tieback member and wherein the tieback member is in contact with the containment module.

20. The fluid collection and storage system of claim 16, further comprising a second containment module in fluid communication with the containment module.

\* \* \* \* \*